US011447935B2

(12) United States Patent
Raszga et al.

(10) Patent No.: US 11,447,935 B2
(45) Date of Patent: Sep. 20, 2022

(54) CAMERA-BASED BOOM CONTROL

(71) Applicant: Deere & Company, Moline, IL (US)

(72) Inventors: Calin Raszga, Dubuque, IA (US); Adam G. Harwood, Dubuque, IA (US); Michael G. Kean, Maquoketa, IA (US); John M. Hageman, Dubuque, IA (US); Justin Sticksel, Galena, IL (US)

(73) Assignee: DEERE & COMPANY, Moline, IL (US)

( * ) Notice: Subject to any disclaimer, the term of this patent is extended or adjusted under 35 U.S.C. 154(b) by 752 days.

(21) Appl. No.: 16/399,106

(22) Filed: Apr. 30, 2019

(65) Prior Publication Data
US 2020/0347580 A1 Nov. 5, 2020

(51) Int. Cl.
G06F 7/70 (2006.01)
G06F 19/00 (2018.01)
G06G 7/00 (2006.01)
G06G 7/76 (2006.01)
E02F 9/26 (2006.01)
G06N 3/08 (2006.01)
E02F 9/22 (2006.01)

(52) U.S. Cl.
CPC ............ *E02F 9/265* (2013.01); *E02F 9/2271* (2013.01); *E02F 9/267* (2013.01); *G06N 3/08* (2013.01)

(58) Field of Classification Search
CPC ......... E02F 9/265; E02F 9/2271; E02F 9/267; G06N 3/08
USPC .......................................................... 701/50
See application file for complete search history.

(56) References Cited

U.S. PATENT DOCUMENTS

| 10,844,572 | B2 | 11/2020 | Bellows et al. | |
| 10,846,843 | B2 | 11/2020 | Gonzalez et al. | |
| 2017/0298592 | A1* | 10/2017 | Akanda | E02F 3/304 |
| 2019/0134440 | A1* | 5/2019 | Carter | F04B 17/06 |
| 2019/0301131 | A1* | 10/2019 | Hendron | E02F 9/205 |
| 2020/0015401 | A1* | 1/2020 | Frei | G06V 10/255 |

(Continued)

FOREIGN PATENT DOCUMENTS

CN 106149775 B 11/2018
DE 19624301 B4 8/2006

(Continued)

OTHER PUBLICATIONS

Russian Search Report issued in Patent Application No. 2020114758, dated Oct. 5, 2021, in 02 pages.

*Primary Examiner* — Mahmoud S Ismail
(74) *Attorney, Agent, or Firm* — Michael Best & Friedrich LLP

(57) ABSTRACT

Systems and methods are described for determining an actual pose of an articulating boom arm using an artificial intelligence mechanism (e.g., a neural network) trained to determine the actual pose of the articulating boom arm based on captured image data. In some implementations, an electronic processor is configured to control movement of the articulating boom arm based at least in part on pose information determined by applying the image-based neural network. In some implementations, an electronic processor is configured to train the neural network by using, as training data, captured image data and output signals from sensors indicative of measured positions of the components of the articulating boom arm.

17 Claims, 5 Drawing Sheets

(56) References Cited

U.S. PATENT DOCUMENTS

2020/0071913 A1\* 3/2020 Garcia Corrochano ..................... A01D 41/127
2021/0087794 A1\* 3/2021 Yamamoto ................ E02F 9/24
2021/0230829 A1\* 7/2021 Okada ................... E02F 9/2041

FOREIGN PATENT DOCUMENTS

JP 2000347708 A 12/2000
RU 2529136 C2 9/2014

\* cited by examiner

CAMERA-BASED BOOM CONTROL

BACKGROUND

The present invention relates to systems and methods for controlling the operation of a boom arm (for example, a boom arm of a feller buncher or excavator).

SUMMARY

In one embodiment, the invention provides a machine—for example, a feller buncher or an excavator—that includes a machine body and an articulating boom arm. The articulating boom arm includes a hoist boom coupled to the machine body and a stick boom coupled to a distal end of the hoist boom. A hoist actuator is configured to controllably adjust an angle of the hoist boom relative to the machine body and a stick actuator is configured to controllably adjust an angle of the stick boom relative to the hoist boom. A hoist sensor outputs a signal indicative of the angle of the hoist boom and a stick sensor outputs a signal indicative of the angle of the stick boom. The machine also includes a camera mounted to the machine with a field of view that includes at least a part of the machine and the boom system. An electronic processor is configured to train a neural network to determine, based on image data captured by the camera, an actual angle of the hoist boom and/or an actual angle of the stick boom. The signal output by the stick sensor, the signal output by the hoist sensor, and image data captured by the camera are used as training input to train the neural network. In some implementations, the neural network is trained to determine the angles of the hoist boom and the stick boom based solely an instant digitized video image from the one or more cameras as the only input(s) to the neural network. The electronic processor is also configured to determine an actual pose of the articulating boom arm based on the signal output from the hoist sensor, the signal output of the stick sensor, and/or the output of the neural network (based on image data captured by the camera) and to operate the hoist actuator and the stick actuator based at least in part on the determined actual pose of the articulating boom arm. In some embodiments, the controller is configured to use the hoist sensor and the stick sensor as the primary mechanism for determining the actual pose of the articulating boom arm and to use the output of the neural network to determine the actual pose of the articulating boom arm only when one or more of the sensors have failed or are missing.

In another embodiment, the invention provides a method for controlling movement of an articulating boom arm of a machine. At least one image is captured by a camera mounted on the machine with a field of view that includes at least a portion of the machine. An artificial intelligence mechanism (e.g., processing captured image data through a trained neural network) is applied with the at least one captured image as an input. The artificial intelligence mechanism is trained to output at least one value indicative of a pose of the articulating boom arm based on the at least one image from the camera as the input. An actuator configured to cause movement of the articulating boom arm is then operated based at least in part on the output of the artificial intelligence mechanism.

In yet another embodiment, the invention provides a method of training a neural network for determining a pose of an articulating boom arm of a machine based on captured image data. A signal is received by an electronic processor from a sensor. The signal is indicative of a measured pose of at least one part of the articulating boom arm and the sensor is configured to directly measure the pose of the at least one part of the articulating boom arm. The electronic processor also receives an image of at least part of the machine captured by a camera mounted to the machine. The neural network is then trained to determine the pose of the at least one part of the articulating boom arm based on one or more captured images. The signal indicative of the measured posed from the sensor and the image captured by the camera are used as training input to train the neural network.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
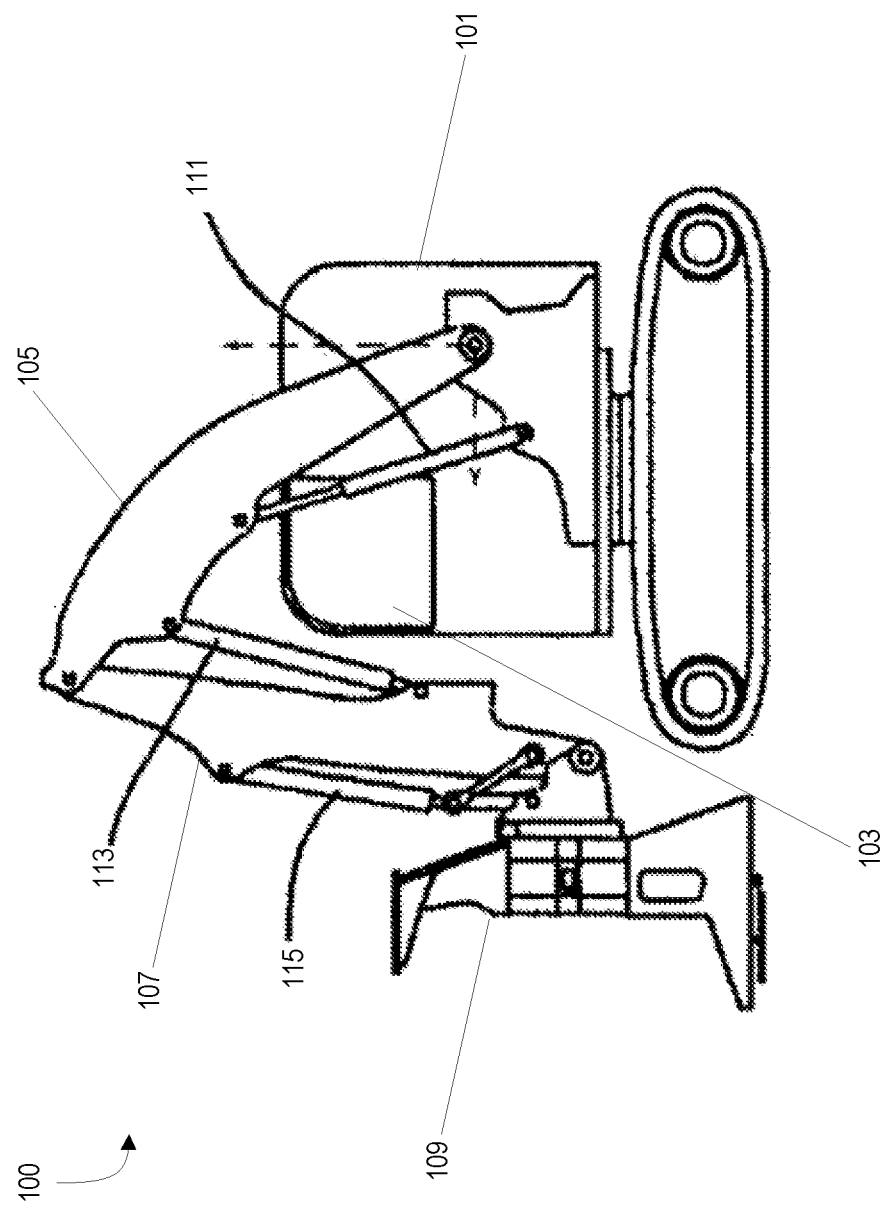
FIG. 1 is an elevation view of a feller buncher according to one embodiment.

FIG. 1 illustrates an example of a heavy machinery (e.g., a feller buncher 100) equipped with an articulated boom arm. The feller buncher 100 includes a main vehicle body 101 with an operator cab 103. An operator of the feller buncher 100 sits within the operator cab 103 and operates the movement of the main vehicle body 101 and the articulated boom arm while visually monitoring the equipment through one or more windows of the operator cab 103. The articulated boom arm includes a hoist boom 105 pivotably coupled to the main vehicle body 101. A stick boom 107 is pivotably coupled to a distal end of the hoist boom 105 and an end effector 109 is coupled to a distal end of the stick boom 107.

A hoist cylinder 111 is coupled between the main vehicle body 101 and the hoist boom 105 and configured to controllably raise and lower the hoist boom 105. Extending a piston of the hoist cylinder 111 increases the angle of the hoist boom 105 relative to the ground (i.e., "raising" the hoist boom 105) while retracting the piston of the hoist cylinder 111 decreases the angle of the hoist boom 105 relative to the ground (i.e., "lowering" the hoist boom 105). Similarly, a stick cylinder 113 is coupled between the hoist boom 105 and the stick boom 107. Extending a piston of the stick cylinder 113 increases the angle of the stick boom 107 relative to the hoist boom 105 while retracting the piston of the stick cylinder 113 decreases the angle of the stick boom 107 relative to the hoist boom 105. Finally, a tilt cylinder 115 is coupled between the stick boom 107 and the end effector 109 and is configured to controllably adjust a tilt angle of the end effector 109 relative to the stick boom 107.

Although the example of FIG. 1 and the discussion below refer specifically to a feller buncher, the systems and methods described herein can be readily applied to other machinery including, for example, an excavator.

Figure 2:
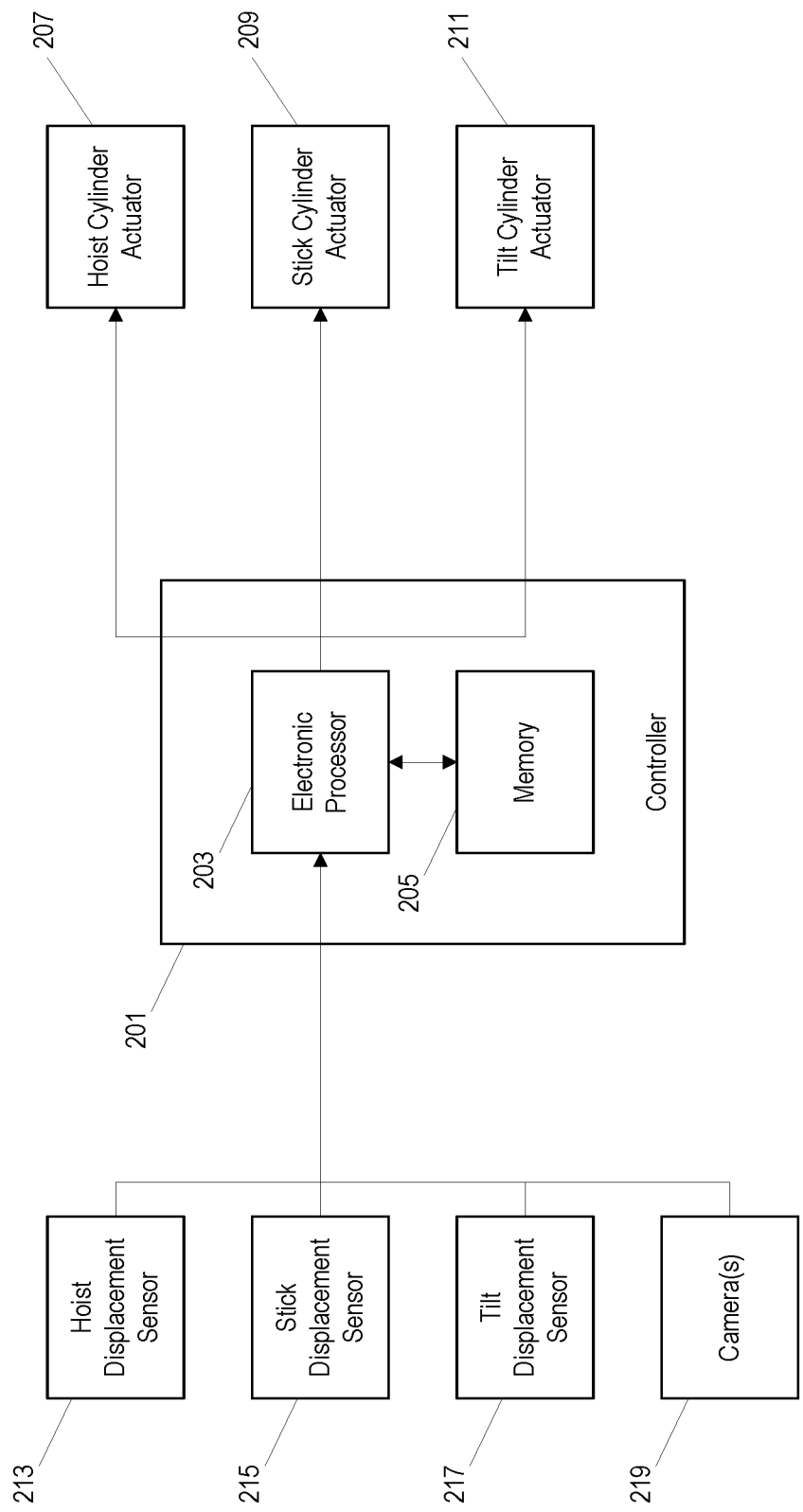
FIG. 2 is a block diagram of a control system for the feller buncher of FIG. 1.

FIG. 2 illustrates an example of a control system for the feller buncher 100 of FIG. 1. The control system includes a controller 201 with an electronic processor 203 and a non-transitory computer-readable memory 205. The memory 205 stores instructions that are executed by the electronic processor 203 to provide the control functionality of the controller 201 including, for example, the functions described herein. The controller 201 is communicatively coupled (e.g., through a wired or wireless connection) to a hoist cylinder actuator 207, a stick cylinder actuator 209, and a tilt cylinder actuator 211. The controller 201 provides control signals/instructions to the cylinder actuators 207, 209, 211 to control the extending and retracting of the piston of each cylinder. In this way, the controller 201 can regulate and controller the raising, lowering, and tilting of the hoist boom 105, the stick boom 107, and the end effector 109.

In some implementations, the hoist cylinder 111, the stick cylinder 113, and the tilt cylinder 115 are all hydraulic cylinders in which a piston is extended by increasing the hydraulic pressure within the cylinder and the piston is retracted by decreasing the hydraulic pressure within the cylinder. In some such implementations, the hoist cylinder actuator 207, the stick cylinder actuator 209, and the tilt cylinder actuator 211 includes one or more hydraulic pumps and/or regulator valves. For example, in some implementations, each cylinder actuator 207, 209, 211 includes a separate hydraulic pump that is controlled based on signals from the controller 201 and configured to extend the cylinder piston by pumping hydraulic fluid into an individual hydraulic cylinder. In some implementations, each cylinder actuator 207, 209, 211 includes a pressure release valve that is controlled based on signals from the controller 201 and configured to retract the cylinder piston by releasing hydraulic fluid from an individual hydraulic cylinder into a fluid reservoir. In some implementations, the cylinder actuators 207, 209, 211 includes a single shared hydraulic pump and a series of controllable valves—the controllable valves operate based on signals from the controller 201 and each individual cylinder piston is extended by controllably opening the respective pressure input valve for the cylinder while the shared hydraulic pump operates causing hydraulic fluid to flow into the respectively cylinder through the open pressure input valve.

To operate the articulation of the boom arm, the controller 201 receives one or more input signals indicative of a movement or positioning instruction. In some implementations, these signals are received from one or more user operated controls—for example, a "joystick" control. Some implementations also provide intelligent boom control functions by providing on-the-fly data regarding the current pose of the boom arm to the controller 201. The controller 201 is then configured to adjust/control the pose of the boom arm based, at least in part, on the current pose information and other control signals. For example, the controller 201 may be configured to determine an actual pose of the boom arm, determine a target pose of the boom arm, and control the cylinder actuators 207, 209, 211 to cause the actual pose of the boom arm to approach the target pose.

To facilitate control of the boom arm pose (using intelligent boom control functions or otherwise), it may be necessary for the controller 201 to determine the relative angles of each portion of the boom arm. For example, the controller 201 may determine an angle of the hoist boom 105 relative to the ground, an angle of the stick boom 107 relative to the hoist boom 105, and a tilt angle of the end effector 109 relative to the stick boom 107. In some implementations, these relative angles may be determined using angle displacement sensors (e.g., a Hall effect sensor) incorporated into the rotation joint between each component of the boom arm. In other implementations, the cylinders 111, 113, 115 that controllable adjust the relative angular positions of each component of the boom arm equipped with a displacement sensor that measures the linear displacement of the piston of each hydraulic cylinder 111, 113, 115. Based on this measured displacement of the cylinder piston(s), the controller 201 is able to determine an angular position of each component of the boom arm. For example, based on the measured displacement of the piston of the hoist cylinder 111, the controller 201 can calculate the angular position of the hoist boom 105 relative to the main vehicle body 101; based on the measured displacement of the piston of the stick cylinder 113, the controller 201 can calculate the angular position of the stick boom 107 relative to the hoist boom 105; and, based on the measured displacement of the tilt cylinder 115, the controller 201 can calculate the tilt angle of the end effector 109 relative to the stick boom 107.

In the example of FIG. 2, the controller 201 is also communicatively coupled to a hoist displacement sensor 213, a stick displacement sensor 215, and a tilt displacement sensor 217 and is configured to determine the relative angular position of each component of the boom arm (i.e., the hoist boom 105, the stick boom 107, and the end effector 109) based on signals received from the displacement sensors 213, 215, 217 indicative of the linear displacement of the piston of each respective cylinder 111, 113, 115.

However, in some implementation, it may be advantageous to incorporate another mechanism for determining a pose of the boom arm in addition to or instead of the series of displacement sensors 213, 215, 217. Accordingly, in the example of FIG. 2, the controller 201 is also communicatively coupled to one or more cameras 219. Each camera 219 is positioned on the machine 100 with a field of view that includes at least part of the articulating boom arm. For example, a camera 219 may be mounted at the end effector 109 with a field of view facing towards the operator cab 103. Additionally or alternatively, a camera 219 may be mounted on (or in) the operator cab with a field of view facing outward towards the end effector/boom arm.

In systems that include one or more cameras, the controller 201 may be configured to utilize an artificial intelligence mechanism (e.g., a neural network) to determine a pose of the articulating boom based on one or more images captured by the camera(a) 219. In some implementations, one or more camera images are provided as input to the neural network and the output of the neural network indicates a position of the articulating boom arm. For example, the controller 201 may be configured to implement a single neural network that receives one or more images as input and provides the same three outputs as the displacement sensors (e.g, a displacement of the hoist cylinder 111, a displacement of the stick cylinder 113, and a displacement of the tilt cylinder 115). In other implementations, the neural network may be configured to instead provide three angle values as outputs each indicative of a relative angular position of a different component of the boom arm (e.g., an angle of the hoist boom 105 relative to the main vehicle body 101, an angle of the stick boom 107 relative to the hoist boom 105, and a tilt angle of the end effector 109 relative to the stick boom 107).

In still other implementations, the neural network may be configured to provide more, fewer, or different outputs. For example, a neural network may be configured to receive as input an image captured by the camera mounted to the end effector and to provide as outputs an indication of the displacement of the stick cylinder and the displacement of the hoist cylinder (i.e., without providing an indication of the tilt angle of the end effector). In other implementations, for example, the neural network may be configured to provide as output an indication of the position and tilt angle of the end effector 109 relative to the ground or relative to the main vehicle body 101 without provide any outputs indicative of the relative positions of the stick boom 107 or the hoist boom 105.

Various different implementations are possible for equipping a machine 100 with one or more cameras and a controller configured to determine a pose of the boom arm based on the camera images. For example, the machine 100 may be equipped with both a set of displacement sensors 213, 215, 217 and one or more cameras 219 (as illustrated in FIG. 2). In some implementations, this type of configuration can be used exclusively to train the neural network based on the captured camera images and the sensed displacement of the cylinders. In other implementations, the camera based neural network can be used as a redundant sensing mechanism and/or as a fallback system in case of a failure of one or more of the cylinder displacement sensors. In some implementations where the camera-based neural network is provided as a fallback sensing mechanism, the controller 201 can be configured to continually or periodically train the neural network based on captured image data and the output of the displacement sensors while the displacement sensors are operating properly. In still other implementations, a machine 100 might be equipped only with the camera-based sensing system (and a previously trained neural network)—the displacement sensors 213, 215, 217 may be omitted entirely to reduce cost and/or complexity of the machine 100. In some implementations, one or more of the displacement sensors 213, 215, 217 may include an inertial monitoring unit (IMU).

Figure 3:
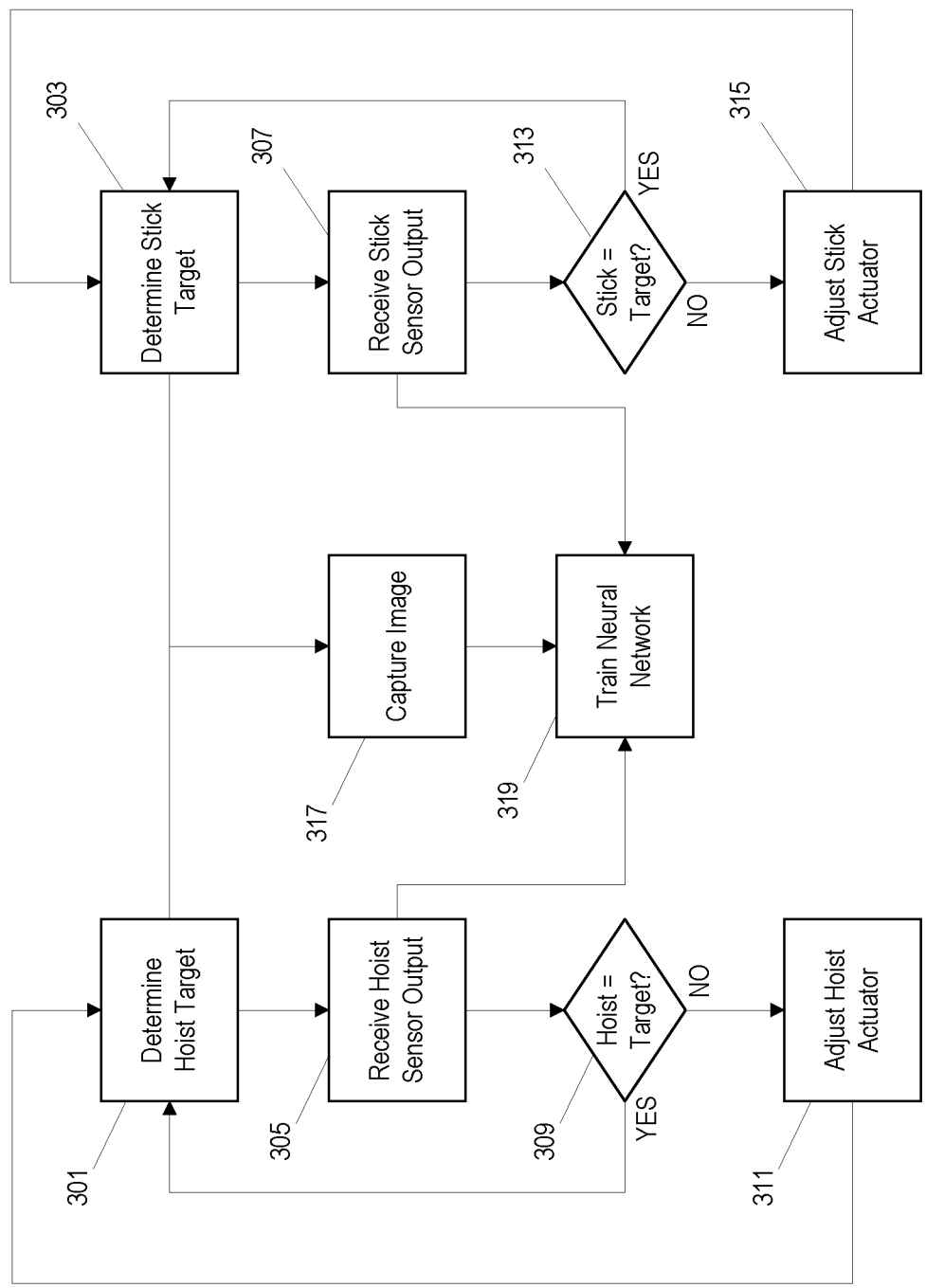
FIG. 3 is a flowchart of a method for training a neural network for determining a pose of a boom arm of the feller buncher of FIG. 1 while also controlling movement of the boom arm.

FIG. 3 illustrates an example of a method for operating a boom arm based on the outputs from one or more displacement sensors while training a neural network based on the displacement sensor outputs and captured images. The system determines a target pose/angle/displacement for the hoist boom 105 (step 301) and a target pose/angle/displacement for the stick boom 107 (step 303)—for example, based on a user control input or as determined by an intelligent boom control function. The system then receives outputs from the hoist displacement sensor 213 (step 305) and from the stick displacement sensor 215 (step 307). If the measured hoist displacement does not match the hoist target (step 309), then the controller 201 sends a signal to the hoist cylinder actuator 207 to adjust a position of the hoist boom 105 towards the hoist target (step 311). Similarly, if the measured stick displacement does not match the stick target (step 313), the controller 201 sends a signal to the stick cylinder actuator 209 to adjust a position of the stick boom towards the target (step 315).

While operating the boom arm based on the measured outputs of the displacement sensors, the controller 201 also periodically captures images through the cameras mounted on the machine 100 (step 317) and provides the captured image along with the corresponding measured displacements from the hoist displacement sensor 213 and the stick displacement sensor 215 as training inputs to train the neural network (step 319).

The method of FIG. 3 might be used, for example, by a manufacturer to train an image-based neural network under test conditions so that the trained neural network can then be installed on machines in the field or prior to the sale of field machines. However, as noted above, in other implementations, the controller 201 might instead be configured for use in a field machine to operate the boom arm based on displacement data from the displacement sensors while the displacement sensors are operating properly and to operate the boom arm based on the output of the image-based neural network in the event of a failure of one or more displacement sensors.

Figure 4:
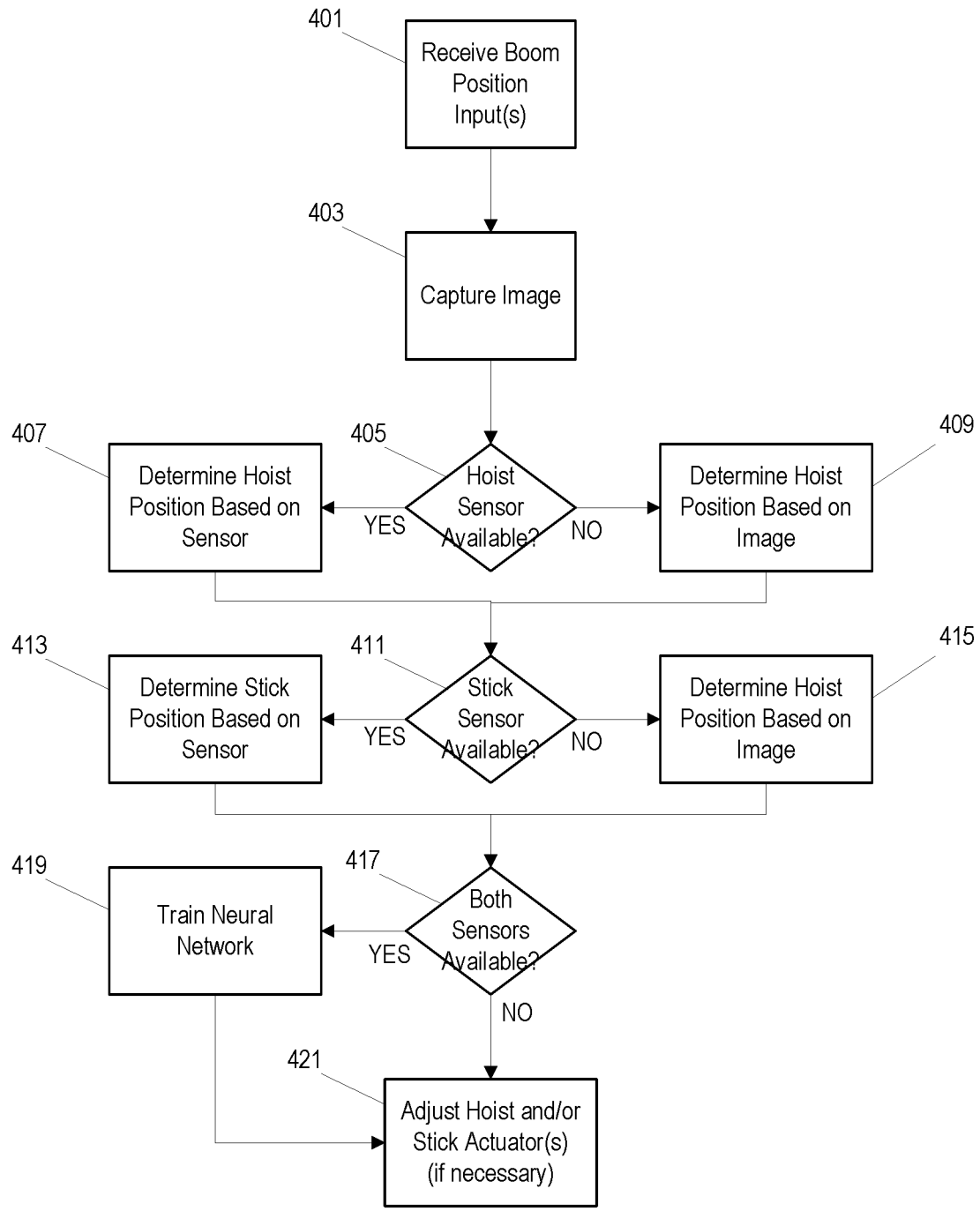
FIG. 4 is a flowchart of a method for using a trained neural network based on camera images as a back-up mechanism for determining a pose of the boom arm of the feller buncher of FIG. 1.

FIG. 4 illustrates an example of a method in which the image-based neural network is used as a back-up to the displacement sensors and where the neural network is further trained by the controller 201 while the displacement sensors are operating properly. The controller 201 receives (or determines) one or more boom position inputs defining a target position or movement of the boom arm (step 401). The controller 201 also captures one or more images from the one or more cameras 219 mounted on the machine 100 (step 403). The controller 201 then determines whether the hoist sensor is available (step 405). If so, the position of the hoist boom 105 is determined based on the output of the hoist displacement sensor 213 (step 407). However, if the hoist sensor is not available (e.g., has been removed or damaged), the controller 201 applies the neural network to determine the position of the hoist boom 105 based on the captured image(s) (step 409). Similarly, the controller 201 then determines whether the stick sensor is available (step 411). If so, the controller 201 determines the position of the stick boom 107 based on the output of the stick displacement sensor 215 (step 413). However, if the stick sensor 215 is not available (e.g., has been removed or damaged), the controller 201 applies the neural network to determine the position of the stick boom 107 based on the captured image(s) (step 415). Furthermore, if the controller 201 determines that both the stick displacement sensor 215 and the hoist displacement sensor 213 are available (step 417), then the controller 201 uses captured camera image(s) and the outputs of the displacement sensors to further train the neural network (step 419). In either case (whether the hoist & stick positions are determined based on the displacement sensor or the image-based neural network), the controller 201 adjusts the hoist cylinder actuator 207 and/or the stick cylinder actuator 209 based on the boom position input(s) and the determined hoist/stick positions (if necessary) (step 421).

In the example of FIG. 4, the image-based neural network is used strictly as a "back-up" mechanism to determine the position of the hoist and/or stick booms 105, 107 in the event of a failure of one or more of the hoist displacement sensor 213 and the stick displacement sensor 215. However, in some implementations, the controller 201 is configured to utilize both the output of the displacement sensors and the output of the image-based neural network in controlling the movement/position of the boom arm. For example, in some implementations, the output of the image-based neural network can be used to detect a failure of a cylinder displacement sensor. For example, the controller 201 might be configured (a) to calculate a difference between the output of the displacement sensor and the output of the image-based neural network and (b) to determine that the displacement sensor has failed when the difference exceeds a threshold or based on a rate of change of the calculated difference.

Finally, as discussed above, the systems and methods described herein may be adapted to train the neural network under normal operating conditions of a field machine or under test conditions. In some implementations where the image-based neural network has already been trained, a controller 201 may be configured to use the trained neural network as the primary mechanism for determining the pose of the boom arm. In some such implementations, the machine 100 might be configured to not include any sensors for directly measuring the pose of the boom arm (e.g., displacement sensors or rotation/angle sensors).

Figure 5:
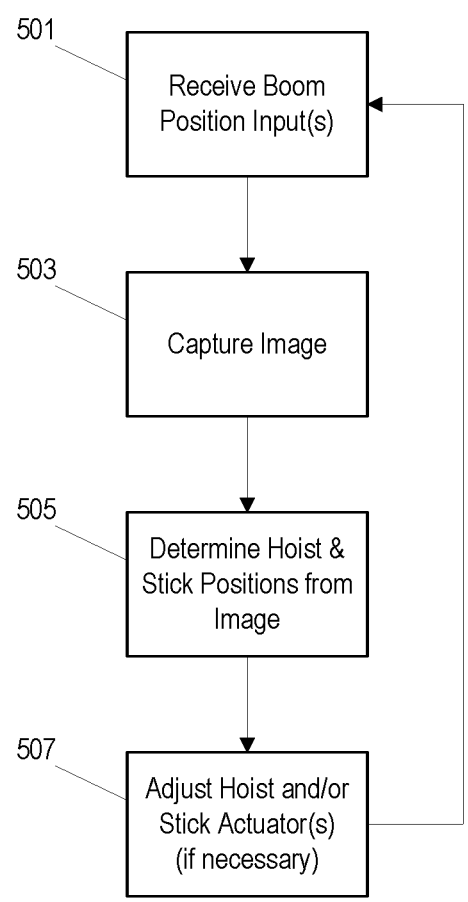
FIG. 5 is a flowchart of a method for controlling a pose of the boom arm of the feller buncher of FIG. 1 using a trained neural network based on camera images.

FIG. 5 illustrates an example of a method for controlling the boom arm of the machine 100 based only on the captured images and a previously trained image-based neural network. Again, the controller 201 receives or determines one or more boom position input(s) (step 501) and captures an image of the boom arm (step 503). However, in this example, the controller 201 applies the trained neural network to determine the positions of the hoist boom 105 and the stick boom 107 based only on the captured image data (step 505). The controller 201 then adjusts the hoist cylinder actuator 207 and/or the stick cylinder actuator 209 as necessary based on the determined positions and the boom position input(s) (step 507).

Although the examples illustrated in FIGS. 3, 4, and 5 only describe mechanisms for determining the positions of the hoist boom 105 and the stick boom 107, these methods can be adapted to determine other positioning variables—for example, a tilt angle of the end effector—in addition to or instead of the hoist boom 105 and/or the stick boom 107.

Additionally, although the examples discussed above primarily focus on one or more cameras positioned on the machine with at least a part of the boom arm in the field of view, in some implementations, the neural network might be trained to determine one or more position values of the boom arm based on images of other parts of the machine 100. For example, a camera might be positioned on the end effector 109 with at least a part of the operator cab 103 and/or the main vehicle body 101 positioned in its field of view and the neural network might be trained to determine a position and/or tilt angle of the end effector relative to the operator cab 103 based on changes in perspective of the operator cab 103 in the images captured by the camera mounted to the end effector 109.

Furthermore, the number of cameras used to train the neural network and/or to operate the machine using the neural network can vary in different implementations. For example, in some implementations, the system may be configured to include only one camera positioned to capture an image of the enter boom arm and to use images from this single camera to train the neural network or to determine the pose of the boom arm. In other implementations, the system may be configured to include multiple cameras each focused on a different part of the machine. For example, a first camera might be positioned on the body of the vehicle to capture an image of the hoist boom while a second camera is coupled to the hoist boom and configured to capture an image of the stick boom. In still other implementations, the system may be configured to include multiple cameras positioned to capture multiple images of the same machine components from various different angles. For example, a first camera might be positioned on the vehicle body to capture images of all or part of the boom arm while a second camera is positioned on the boom arm near the end effector to capture images of all or part of the boom arm and, in some cases, the machine body. As another example, the system might include multiple cameras mounted on the vehicle body of the machine both positioned to capture images of the boom arm from different perspectives. In some implementations, training and using the neural network with images from multiple different cameras can increase the probability of a correct position determination.

In some implementations, the positioning and field of view of the cameras can be designed to limit the collection of image shapes to be processed. For example, a camera might be positioned with a position that is fixed relative to the boom arm and configured to capture an image of the vehicle body or a specific target component on the vehicle body. Accordingly, image data captured by the camera would only need to be processed to identify a more limited set of possible shapes/orientations in order to determine a relative position of the boom arm.

Similarly, in some implementations, a special paint (e.g., a particular color paint, a reflective paid, or an infrared reflective paint) might be used on the boom arm and/or the vehicle body of the machine in order to improve/simply image processing in distinguishing between parts of the machine and the image background in images captured by the camera(s). In some implementations, distinctive colors or other markings can be used on different components of the machine to simplify the processing required to distinguish individual components of the machine from the background and from other components of the machine. In some implementations, numerical/digital filtered can be applied to the captured image before it is processed through the neural network (e.g., for training of the neural network or for use of the neural network in determining the position of the boom arm).

Furthermore, in some implementations, the system may be configured to include infra-red (IR) or near infra-red (NIR) illumination/cameras for better performance in low-light conditions. In some such implementations, retroreflective tape can be positioned on the linkage components to better distinguish particular components from the rest of the image frame. For example, the system might be configured to capture a pair of images—one with active illumination in IR or NIR and one without—and to compare the captured image data to isolate machine components from the image background.

Although many of the examples above discuss using either image-based mechanisms or sensor-based mechanisms separately, in some implementations, data from sensors and/or user input controls can be used to supplement the image data for training and/or use of the neural network. For example, based on a previously determined pose of the boom arm and a user control input, the number of possible positions for the boom arm can be greatly reduced. In other words, the distance (e.g., angle) that are particular component of the boom arm has moved since a prior position determination is limited, for example, by the highest possible speed of the actuator used to adjust the position of the component. Accordingly, a new pose of the boom arm can only differ from the previously determined pose of the boom arm by a known (or determinable) range. Similarly, in some implementation, other image processing techniques—including, for example, blob tracking, marker-based tracking, and template matching—can be applied to the image data and provided as inputs to the neural network or used in parallel with the neural network to provide redundant determinations for cross-checking.

In the examples above, the neural network is trained by capturing image data from an actual machine and comparing the captured image data with the known positions of the boom arm as determined by other sensors. However, in some implementations, training of the neural network can be performed or supplemented using virtual images of a 3D model of the machine. For example, a 3D digital model of the machine can be generated in a computing environment and a software process can be configured to generate virtual images of the machine with the boom arm in various different poses. Because the pose of the 3D model of the machine is controlled by the software process, the pose of the boom arm corresponding to each virtual image is known. Accordingly, the software process can be configured to train a neural network based on the virtual images. In some implementations, a neural network trained using a 3D model of the machine and virtual images can be tested and refined using an actual machine equipped with one or more cameras and boom arm sensors. However, using the virtual images to initially train the neural network can greatly reduce the time required to train a robust neural network. Furthermore, in some implementations, the system can be configured to generate a "processed image library" in a digital format which allows for a fast numerical image comparison and data interpolation.

Finally, in some implementations, the methods described above might be adapted to operate with other types of sensors, other types of actuators, and/or other types of imaging modalities. Although the examples described above focus on the use of hydraulic cylinders as the actuators for controllably adjusting the pose of the boom arm, in some implementations, the system might be configured to utilize other actuators including, for example, linear motors or pneumatic devices. Similarly, although the examples describes above focus on displacement sensors that are configured to measure the displacement of a piston in a hydraulic cylinder in order to measure the pose of the boom arm, in some implementations, other types of sensors might be utilized including, for example, rotational sensors, radar/lidar, or sonar to directly measure a position of one or more of the boom components. Additionally, although the examples described above generally discuss capturing and processing "images" in order to train and utilize the neural network, different specific imaging modalities might be utilized in various different implementations. For example, some implementation may be configured to capture and utilize color images while other implementations capture/utilize black-and-white image. Other implementations might utilize video image data while still other implementations may utilize surface scanning and/or structure light projection techniques as inputs to the neural network.

Thus, the invention provides, among other things, systems and methods for using and training a neural network to determine a pose of a boom arm of a machine based on captured image data. Various features and advantages of the invention are set forth in the following claims.

What is claimed is:

1. A system comprising:
   a machine including
      a machine body,
      an articulating boom arm including a hoist boom coupled to the machine body and a stick boom coupled to a distal end of the hoist boom,
      a hoist actuator configured to controllably adjust an angle of the hoist boom relative to the machine body, and
      a stick actuator configured to controllably adjust an angle of the stick boom relative to the hoist boom;
   a hoist sensor configured to output a signal indicative of the angle of the hoist boom relative to the machine body that is directly measured by the hoist sensor;
   a stick sensor configured to output a signal indicative of the angle of the stick boom relative to the hoist boom that is directly measured by the stick sensor;
   a camera mounted to the machine with a field of view that includes at least a part of the machine;
   an electronic processor configured to
      train a neural network to determine, based on image data captured by the camera, at least one selected from a group consisting of the angle of the hoist boom relative to the machine body and the angle of the stick boom relative to the hoist boom, wherein the signal output by the hoist sensor, the signal output by the stick sensor, and an image captured by the camera are used as training input to train the neural network, wherein the electronic processor is configured to train the neural network by training the neural network only while the hoist sensor and the stick sensor are operating properly;
      determine whether the hoist sensor is operating properly;
      determine whether the stick sensor is operating properly;
      determine an actual pose of the articulating boom arm based on at least one selected from a group consisting of the signal output from the hoist sensor, the signal output by the stick sensor, and the output of the neural network based on image data captured by the camera, wherein the electronic processor is configured to determine the actual pose of the articulating boom arm by
         determining the actual pose of the articulating boom arm based on the signal output from the hoist sensor and the signal output from the boom sensor in response to determining that both the hoist sensor and the stick sensor are operating properly, and
         determining the actual pose of the articulating boom arm based on the output of the neural network based on image data captured by the camera in response to determining that the hoist sensor and the stick sensor are not both operating properly; and
      operate the hoist actuator and the stick actuator based at least in part on the determined actual pose of the articulating boom arm.

2. The system of claim 1, wherein the hoist actuator includes a hydraulic hoist cylinder configured to increase the angle of the hoist boom relative to the machine body by extending a piston of the hydraulic hoist cylinder and to decrease the angle of the hoist boom relative to the machine body by retracting the piston of the hydraulic hoist cylinder, and
   wherein the hoist sensor includes a displacement sensor configured to directly measure a linear displacement of the piston and to output a signal indicative of the linear displacement of the piston.

3. The machine of claim 2, wherein the electronic processor is further configured to determine whether the hoist sensor is operating properly, and wherein the electronic processor is configured to determine the actual pose of the articulating boom arm by
   determining an actual angle of the hoist boom relative to the machine body based on the output of the displacement sensor in response to determining that the hoist sensor is operating properly, and
   determining the actual angle of the hoist boom relative to the machine body based on the output of the neural network based on image data captured by the camera in response to determining that the hoist sensor is not operating properly.

4. The system of claim 1, wherein the stick actuator includes a hydraulic stick cylinder configured to increase the angle of the stick boom relative to the hoist boom by extending a piston of the hydraulic stick cylinder and to decrease the angle of the stick boom relative to the hoist boom by retracting the piston of the hydraulic stick cylinder, and
wherein the stick sensor includes a displacement sensor configured to directly measure a linear displacement of the piston and to output a signal indicative of the linear displacement of the piston.

5. The machine of claim 4, wherein the electronic processor is further configured to determine whether the stick sensor is operating properly, and wherein the electronic processor is configured to determine the actual pose of the articulating boom arm by
determining an actual angle of the stick boom relative to the hoist boom based on the output of the displacement sensor in response to determining that the stick sensor is operating properly, and
determining the actual angle of the stick boom relative to the hoist boom based on the output of the neural network based on image data captured by the camera in response to determining that the stick sensor is not operating properly.

6. The system of claim 1, wherein the camera is mounted on the machine body and positioned with a field of view including at least part of the articulating boom arm.

7. The system of claim 1, wherein the camera is mounted on an end effector of the articulating arm and positioned with a field of view including at least part of the articulating boom arm.

8. The system of claim 1, wherein the camera is mounted on an end effector of the articulating arm and positioned with a field of view including at least part of the machine body.

9. The system of claim 1, wherein at least one selected from a group consisting of the hoist sensor and the stick sensor includes an inertial measurement unit.

10. The system of claim 1, further comprising a plurality of cameras, wherein each camera of the plurality of cameras is mounted on the machine and positioned to capture a different portion of the machine or a different perspective of at least a portion of the machine, and wherein the electronic processor is configured to train the neural network by training the neural network based on image data from each of the plurality of cameras.

11. A system comprising:
a machine including
a machine body,
an articulating boom arm including a hoist boom coupled to the machine body and a stick boom coupled to a distal end of the hoist boom,
a hoist actuator configured to controllably adjust an angle of the hoist boom relative to the machine body, and
a stick actuator configured to controllably adjust an angle of the stick boom relative to the hoist boom;
a hoist sensor configured to output a signal indicative of the angle of the hoist boom relative to the machine body that is directly measured by the hoist sensor;
a stick sensor configured to output a signal indicative of the angle of the stick boom relative to the hoist boom that is directly measured by the stick sensor;
a camera mounted to the machine with a field of view that includes at least a part of the machine;
an electronic processor configured to
train a neural network to determine, based on image data captured by the camera, at least one selected from a group consisting of the angle of the hoist boom relative to the machine body and the angle of the stick boom relative to the hoist boom, wherein the signal output by the hoist sensor, the signal output by the stick sensor, and an image captured by the camera are used as training input to train the neural network;
determine an actual pose of the articulating boom arm based on at least one selected from a group consisting of the signal output from the hoist sensor, the signal output by the stick sensor, and the output of the neural network based on image data captured by the camera; and
operate the hoist actuator and the stick actuator based at least in part on the determined actual pose of the articulating boom arm,
wherein at least a portion of the machine includes a reflective paint, and wherein the electronic processor is further configured to filter the image data from the camera to distinguish the reflective paint on the machine from an image background before providing the captured image data as input to the neural network.

12. The system of claim 1, wherein the electronic processor is configured to train the neural network by training the neural network based on the image data captured by the camera, a previously determined pose of the articulating boom arm, and known limits of at last one actuator selected from a group consisting of the hoist actuator and the stick actuator.

13. A method for controlling movement of an articulating boom arm of a machine, the method comprising:
determining whether a position sensor is operating properly, wherein the position sensor is configured to directly measure a pose of at least one part of the articulating boom;
determining an actual pose of the articulating boom arm based on a signal output of the position sensor in response to determining that the position sensor is operating properly;
determining the actual pose of the articulating boom arm based on an artificial intelligence mechanism in response to determining that the position sensor is not operating properly, wherein determining the actual pose of the articulating boom arm based on the artificial intelligence mechanism includes:
capturing at least one image with a camera mounted on the machine, wherein the field of view of the camera includes at least a portion of the machine;
applying the artificial intelligence mechanism with the at least one image as an input to the artificial intelligence mechanism, wherein the artificial intelligence mechanism is trained to output at least one value indicative of a pose of the articulating boom arm based on the at least one image as the input; and
operating an actuator configured to cause movement of the articulating boom arm based at least in part on the determined actual pose of the articulating boom arm.

14. The method of claim 13, further comprising training the artificial intelligence mechanism in response to determining that the position sensor is operating properly, wherein training the artificial intelligence mechanism includes training a neural network to produce the same actual position output as determined based on the position sensor in response to receiving the at least one image as input to the neural network.

15. The method of claim 13, wherein the position sensor includes a hoist sensor configured to output a signal indicative of an angle of a hoist boom of the articulating arm relative to a machine body of the machine, and wherein the artificial intelligence mechanism is trained to output a value indicative of the angle of the hoist boom of the articulating arm relative to the machine body of the machine.

16. The method of claim 13, wherein the position sensor includes a stick sensor configured to output a signal indicative of an angle of a stick boom of the articulating arm relative to a hoist boom of the articulating arm, and wherein the artificial intelligence mechanism is trained to output a value indicative of the angle of the stick boom relative to the hoist boom.

17. The method of claim 16, further comprising determining whether a second position sensor is operating properly, wherein the second position sensor is a hoist sensor configured to output a signal indicative of an angle of the hoist boom of the articulating arm relative to a machine body of the machine, wherein determining the actual pose of the articulating boom arm based on the signal output of the position sensor in response to determining that the position sensor is operating properly includes determining the actual pose of the articulating boom arm based on the signal output of the position sensor and the signal output of the second position sensor in response to determining that the second position sensor is operating properly, and determining the actual pose of the articulating boom arm based on the signal output of the position sensor and an output of the artificial intelligence mechanism indicative of the angle of the hoist boom relative to the machine body in response to determining that the second position sensor is not operating properly, and wherein determining the actual pose of the articulating boom arm based on the artificial intelligence mechanism in response to determining that the position sensor is not operating properly includes determining the actual pose of the articulating boom arm based on the signal output of the second position sensor and the output of the artificial intelligence mechanism indicative of the angle of the stick boom relative to the hoist boom in response to determining that the second position sensor is operating properly, and determining the actual pose of the articulating boom arm based on the output of the artificial intelligence mechanism indicative of the angle of the hoist boom relative to the machine body and the output of the artificial intelligence mechanism indicative of the angle of the stick boom relative to the hoist boom in response to determining that the second position sensor is not operating properly.

* * * * *